Figure 1:
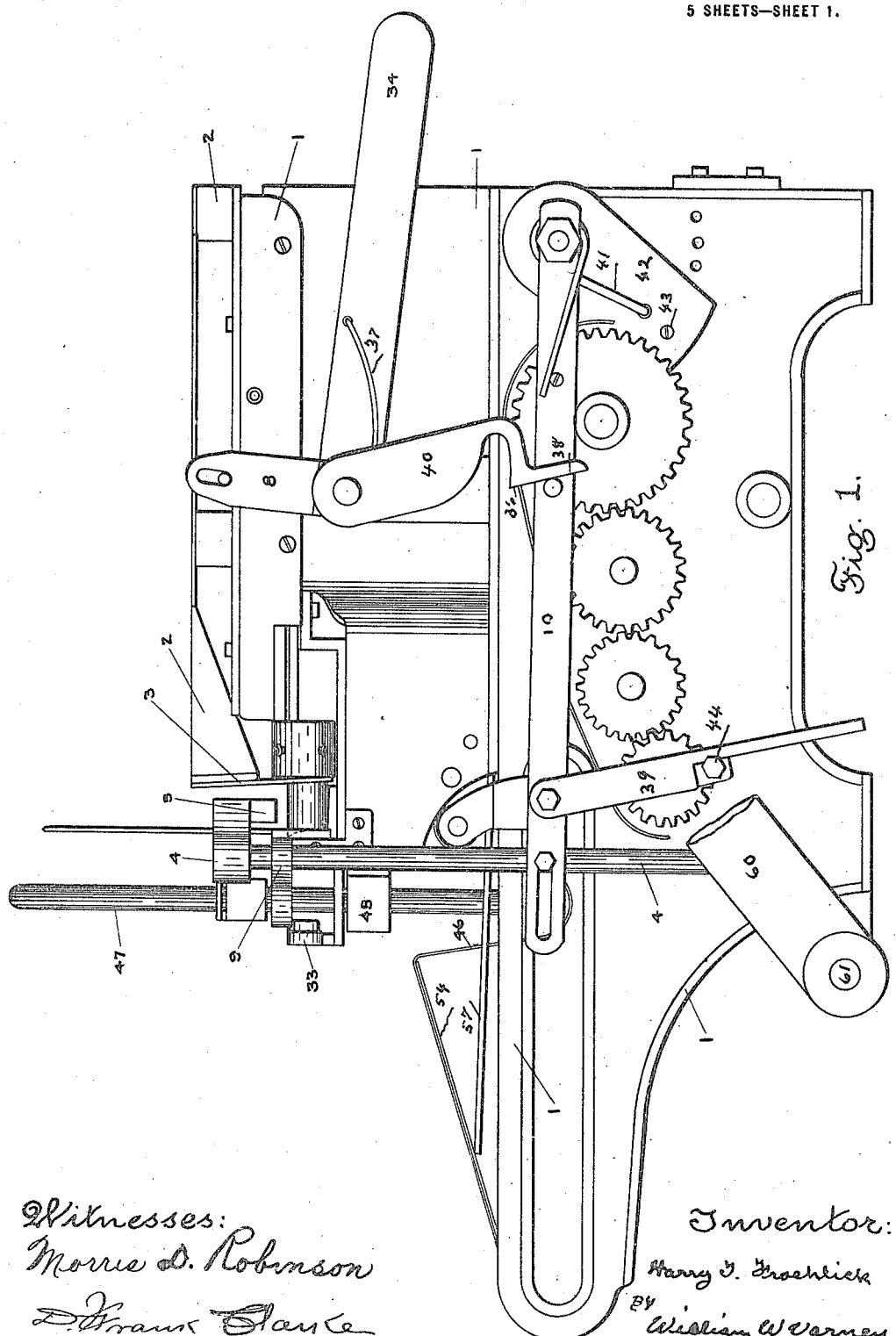

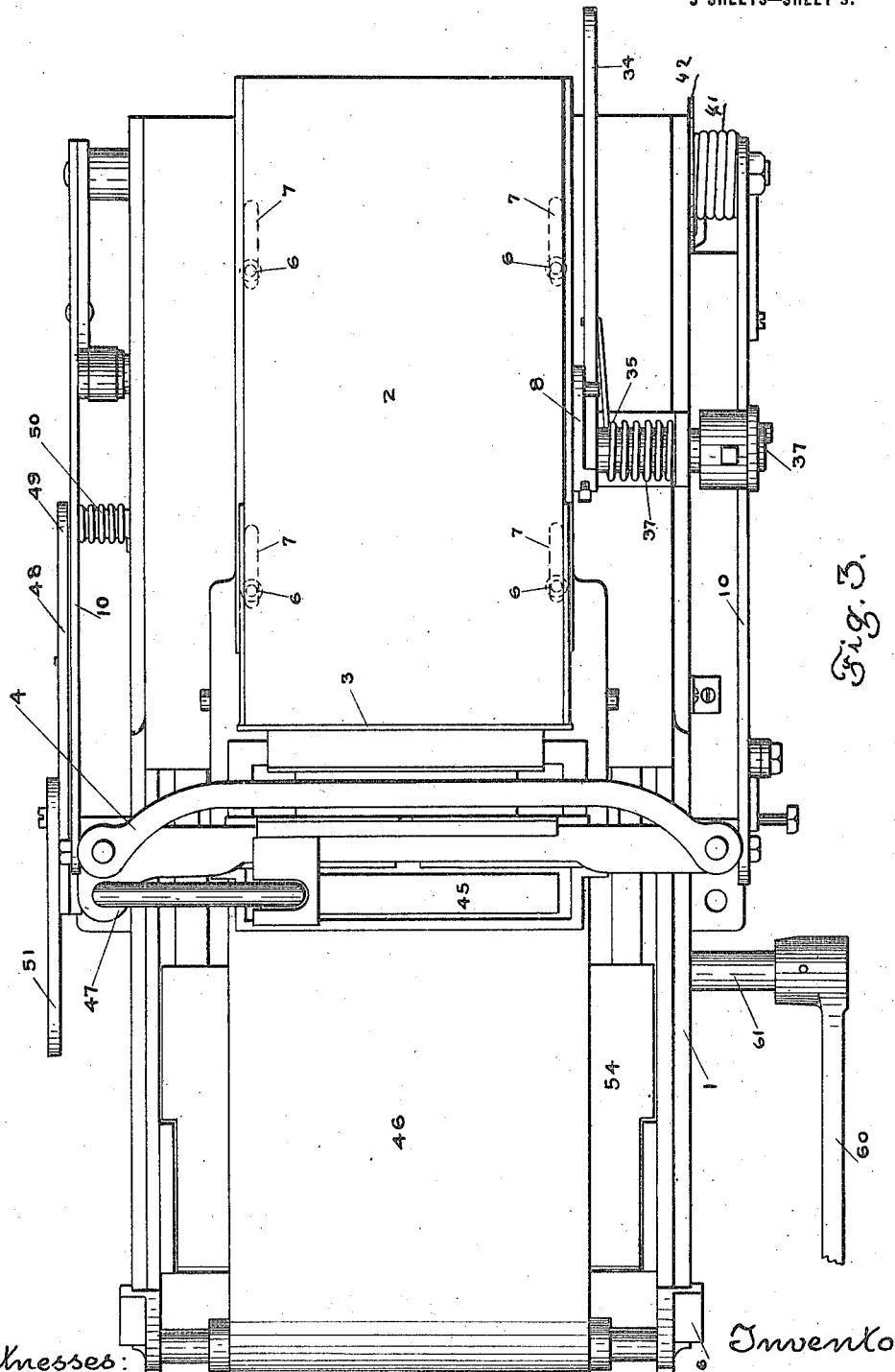

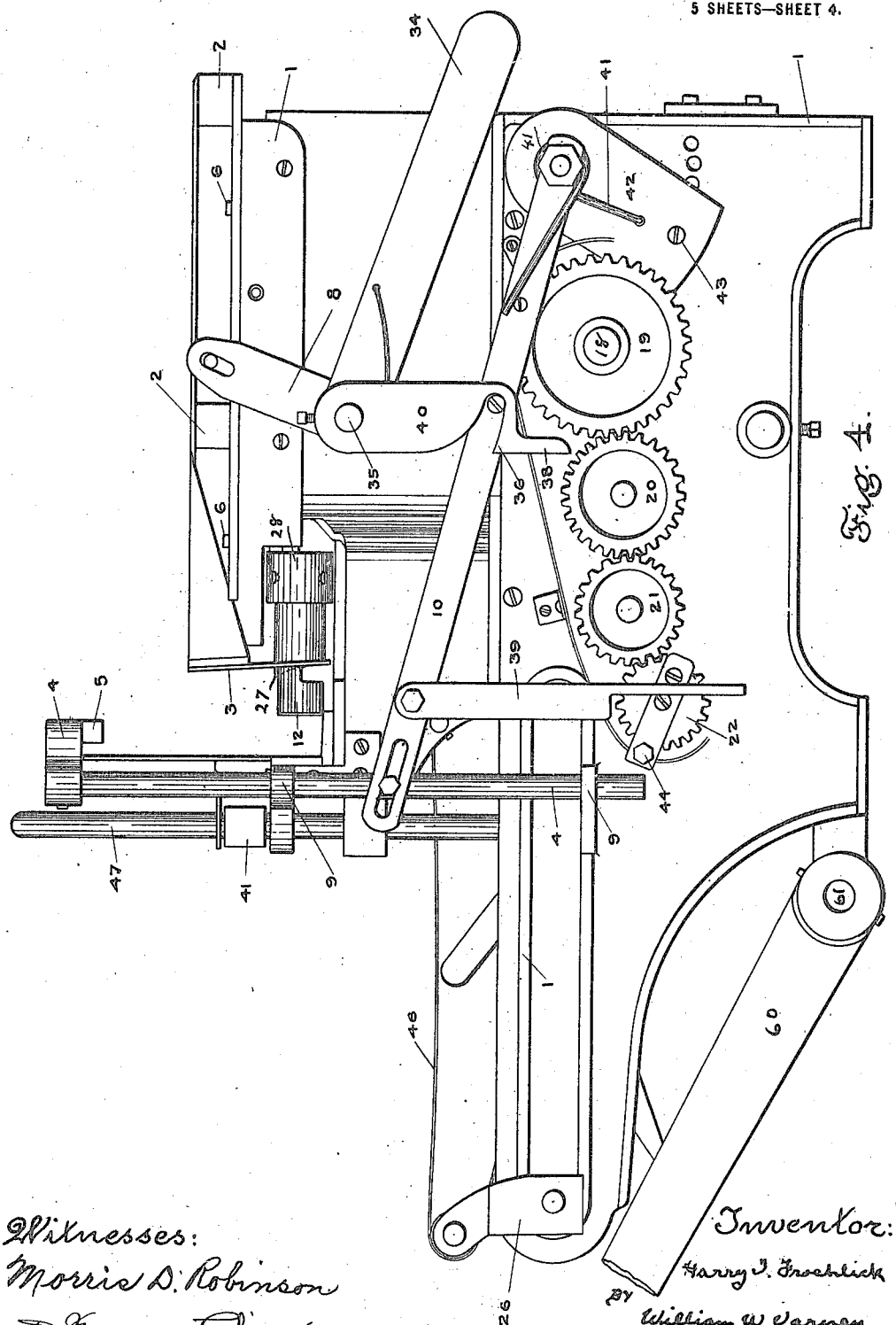

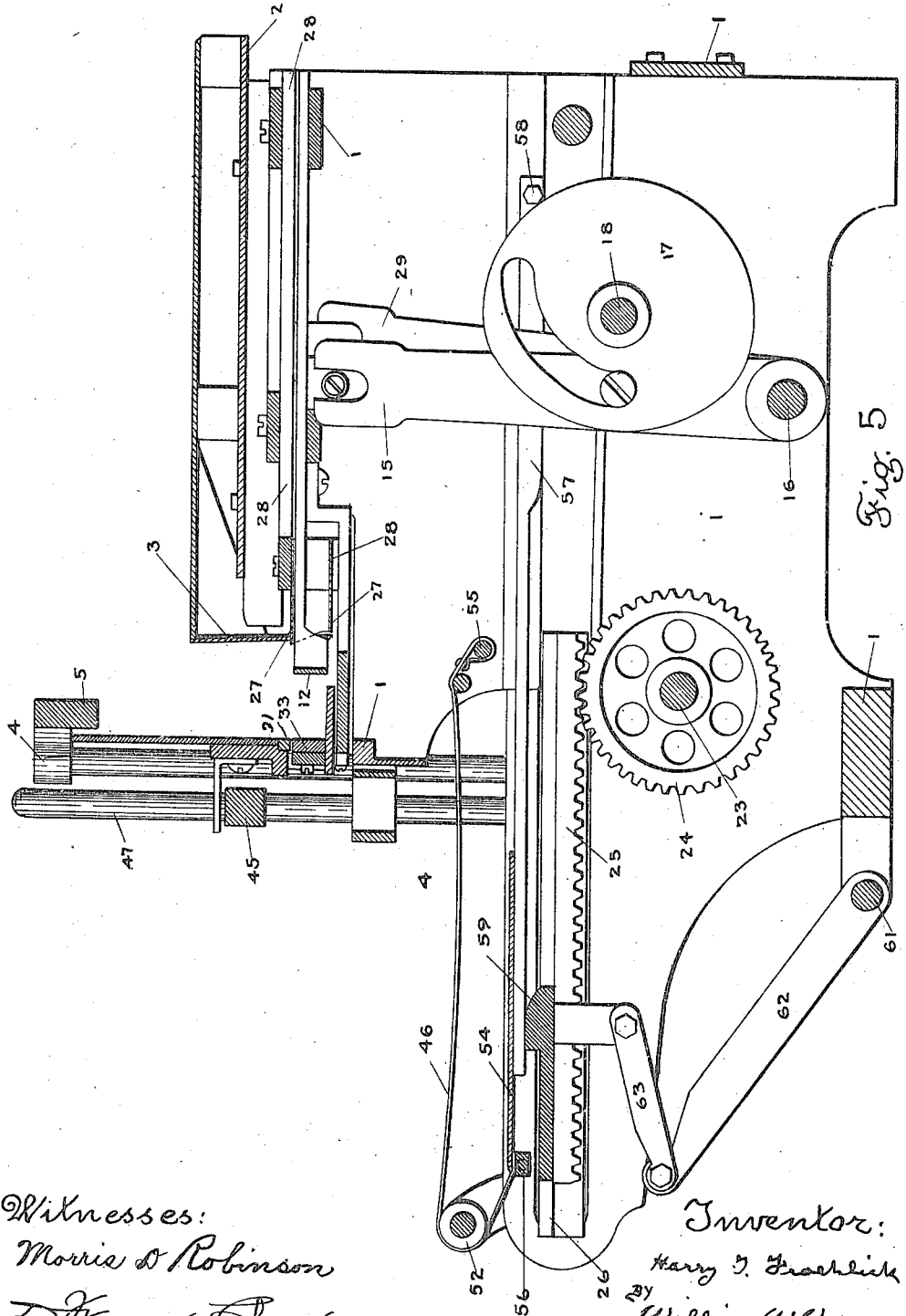

UNITED STATES PATENT OFFICE.

HARRY T. FROEHLICK, OF PHILADELPHIA, PENNSYLVANIA, ASSIGNOR TO BRIGHT CIGAR MACHINE COMPANY, A CORPORATION OF DELAWARE.

PROCESS OF BUNCHING MATERIAL.

1,255,402.          Specification of Letters Patent.          Patented Feb. 5, 1918.

Application filed June 26, 1916. Serial No. 105,977.

*To all whom it may concern:*

Be it known that I, HARRY T. FROEHLICK, a citizen of the United States, residing in the city of Philadelphia, in the county of Philadelphia and the State of Pennsylvania, have invented certain new and useful Improvements in the Processes of Bunching Material, of which the following is a specification.

My invention relates to an improved process of bunching material and has for its object an improved process of sizing and shaping a filler for a bunch.

A further object of my invention is an improved process of packing material preparatory to sizing and shaping a bunch.

A further object of my invention is an improved process of forming a filler having a uniform degree of compactness.

A further object of my invention is the process of equalizing the filler after having been determined in size and quantity properly arranged.

With the foregoing and other objects in view my invention consists of the novel treatment, combination and arrangement of processes herein described and demonstrated by the accompanying drawings, wherein is shown an apparatus capable of having my process practised therein, but it is understood that changes, variations and modifications can be resorted to which come within the scope of the claims hereunto appended.

In this specification I have used the term bunch as meaning an aggregation of pieces of material brought together and a binder wrapped around the same; and have used the term filler as representing the above mentioned aggregation of pieces of material.

Heretofore bunching machines especially cigar machines have used fillers reduced to the proper length of the cigar desired fed into the machine by a pressure operating in one plane and then cutting off the amount desired; but in so doing it compacts the filler to such an extent and manner that the bunch does not have the elasticity and light puffedness desired, and further more tobacco is forced into the bunch than is necessary in a properly made bunch.

In my process the material is put into an enlarged receptacle and is compressed to the degree desired in one plane bringing the material to a definite thickness and then is compressed to the degree desired and limited to a definite amount in another plane to a degree of compactness predetermined and adjustable.

After a mass of material of definite thickness and of uniform and definite compactness is thus formed I cut a blank out of the same by means of a proper die and cutter which blank forms my filler suitable for the bunch desired.

The above blank or filler is freed from its compressing surfaces permitting the same to adjust itself preparatory to receiving the binder.

Figure 2:
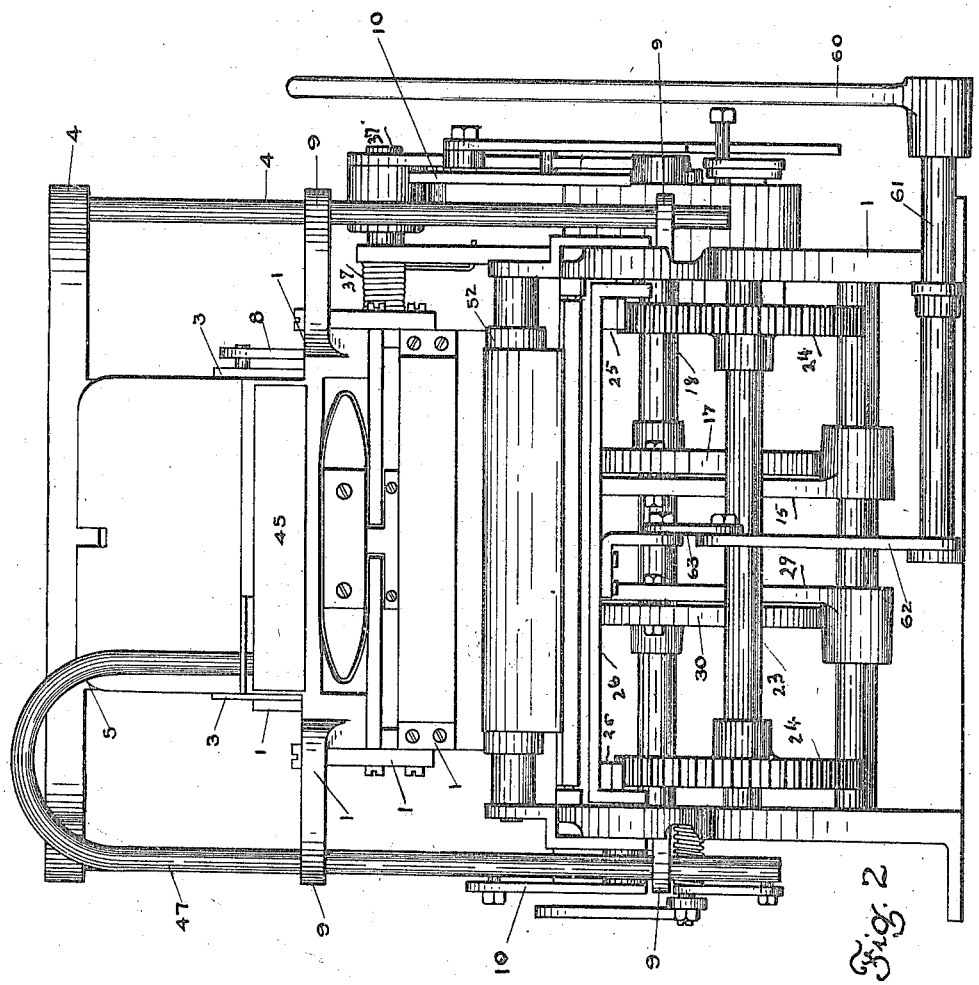

In the drawings of the herein described embodiment of an apparatus capable of executing my process; Figure 1 shows a view in elevation after sizing and shaping the filler; Fig. 2 is a view in elevation taken at right angles to that shown in Fig. 1; Fig. 3 is a plan view of the same; and Fig. 4 shows a view in elevation before sizing and shaping. Fig. 5 is a sectional view of the apparatus in a similar position to that shown in Fig. 4.

Similar numerals refer to similar parts throughout the several views.

1 is the main frame; 2 is the horizontal compressor frame having face 3 formed on the end of compressor frame 2 in an undercut or inclined position to give clearance for the material when forced past the same; 4 is the vertical compressor frame carrying vertical compressor 5.

Horizontal compressor frame 2 operates on main frame 1 and is held in place thereon by pins 6 operating through slots 7, and is operated by bell crank 8.

Vertical compressor frame 4 operates through guides 9 secured to the main frame 1, and is operated by levers 10 which levers 10 are secured to a shaft journaled in main frame 1.

Mold plunger 12 is operated by lever 15 fulcrumed to main frame 1 at 16 and operated by cam 17 which cam 17 is secured to shaft 18 journaled in main frame 1 and operated by gears 19, 20, 21 and 22.

Gear 22 is secured to shaft 23 which shaft is journaled in main-frame 1. On shaft 23 are gears 24 which are operated by racks 25 secured to carriage 26 which carriage operates in guides in main frame 1.

27 is the shaping knife operating as a sleeve over mold plunger 12, and is of the desired shape to give the proper form to the bunch, and is secured to knife head 28, which knife head operates in guides in main frame 1, and is operated by lever 29, which lever is fulcrumed to main frame 1 at 16, and is operated by cam 30 secured to shaft 18.

33 is a mold guard secured to mold plunger 12 at a definite distance therefrom sufficient to form thickness of the blank of material to be operated upon by shaping knife 27.

Horizontal compressor face 3 being operated by handle 34 through bell crank 8 fulcrumed to main frame 1 at 35 on shaft 37 is timed with vertical compressor 5 so that when face 3 is flush with the face of mold plunger 12 vertical compressor 5 compresses the material contained between face 3, mold plunger 12, die 31 and mold guard 33 to a definite degree of compression automatically.

Levers 10 operating compressor frame 4 are operated in their opening movement by pendulum 39 and are held in open position by hook 40 automatically operated by catch 36 by means of spring 37 and guard 38 which hook is secured to shaft 35 and operated thereby so that when face 3 is in proper position for compressor 5 to act it releases levers 10 automatically said levers 10 being acted upon by a yielding pressure which may be adjusted such as spring 41 secured to adjusting plate 42 which plate 42 is adjustably secured to main frame 1 by pin 43.

Pendulum 39 is operated by crank 44 which crank is secured to shaft 23, is operated thereby, and timed to lift pendulum 39 on the outward movement of racks 25.

Mold plunger 12 operated by cam 17 is timed with reference to shaping knife 27, so that shaping knife 27 operates over mold plunger 12 when in its open position ready to receive the material said knife continuing to operate until it reaches and enters knife die 31 then shaping knife 27 remains stationary and mold plunger 12 is forced out of the knife carrying with it and between its face and mold guard 33 the blank of material cut by the knife in its operation.

The timing of the operation of the knife with reference to racks 25 being such that the racks are in an out or open position when the knife is out or open, the knife beginning to act as the racks move in and ceasing to act at about the middle position of the racks, when the knife plunger begins to act and ceases at the end of the movement of the racks, after which position the blank of material is ready to be expelled from between mold plunger 12 and mold guard 33 by means of ejector 45 which forces the filler down into the pocket of binding belt 46.

Ejector 45 is operated by ejector frame 47 which frame is journaled in main frame 1 and held in open position by lever 48 fulcrumed at 49 to main frame 1 and operated by spring 50. On lever 48 is handle 51 for operating the same.

52 is the binding roller journaled in bearings on carriage 26 at its outer end.

46 is the binding belt secured at one end to fulcrumed platform 54 and at the other end is secured to holder 55, the length of said belt being suitable to form a pocket and properly roll and bind the material in the same.

Fulcrumed platform 54 is fulcrumed at 56 to main frame 1 and is lifted by levers 57, which levers are fulcrumed to main frame 1 at 58 and are operated by wedges or cams 59 secured to carriage 26 and timed to raise the same at the inner position of said carriage.

60 is the main operating lever secured to shaft 61 operating in journals secured to main frame 1. On shaft 61 is lever 62 which operates carriage 26 by means of link 63.

Having thus described my invention, what I claim and desire to secure by Letters Patent is:

1. The process of aggregating material consisting of, assembling a mass of the same in excess of the amount desired, bringing the mass to a definite dimension in one direction, and exerting a pressure limited to a definite amount upon it in another direction, and while in such condition cutting a definite shape from the same.

2. The process of forming cuts or abstracts of uniform density and amount from a mass of fibrous material comprised in assembling a unit mass, bringing a pressure on the same in a plane in one direction at right angles to the length of the fibers, bringing a pressure limited to a definite amount on the mass in the remaining dimension and while such mass is held under such pressures dieing or cutting a definite shape of mass therefrom.

3. The process of automatically forming cuts or abstracts of predetermined uniform density and amount from a mass of fibrous material comprised in assembling a unit mass and automatically bringing a pressure in one plane in one dimension and automatically bringing a pressure limited to a definite amount on the mass in the remaining dimension and while such mass is held under such pressure automatically dieing or cutting a definite shape of mass therefrom.

4. The construction of a cigar bunch consisting of placing sprigs of tobacco in a generally parallel direction in a receptacle bringing the sides of the receptacle parallel with the sprigs together to a predetermined dimension in one direction and to a predetermined pressure limited to a definite amount in the other direction, and while in such confinement cutting therefrom a cigar bunch of predetermined shape and density.

5. The method of forming a cigar bunch consisting of placing tobacco in a receptacle, bringing the sides of the receptacle in proximity to a cutting die together to a definite predetermined position; compressing the tobacco between the said sides then exerting a pressure limited to a definite amount upon the tobacco to force the same along said sides in front of a cutting die and to a predetermined density then cutting therefrom a filler of predetermined shape and density.

HARRY T. FROEHLICK. [L. S.]

Witnesses:
ALICE V. YARWOOD,
RALPH ROSENFELT.

Copies of this patent may be obtained for five cents each, by addressing the "Commissioner of Patents, Washington, D. C."